(No Model.) 2 Sheets—Sheet 2.
W. F. HARTIG.
SHOVEL PLOW.
No. 538,962. Patented May 7, 1895.
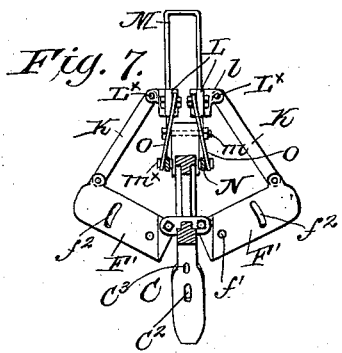
Fig. 7.
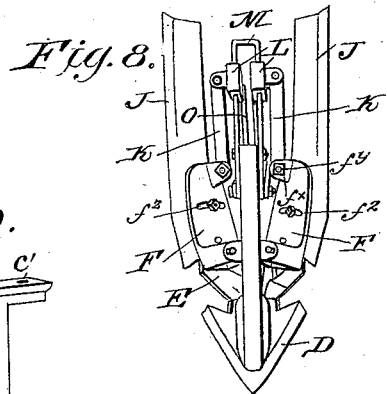
Fig. 8.
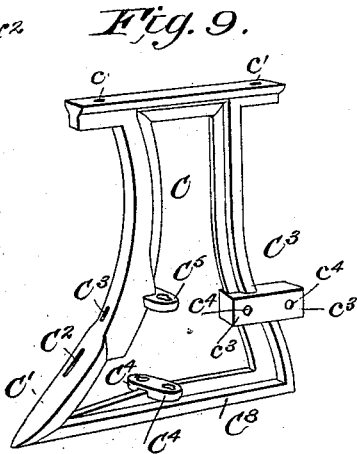
Fig. 9.
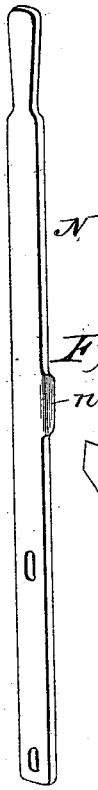
Fig. 10.
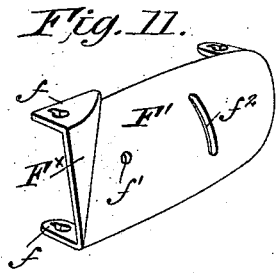
Fig. 11.
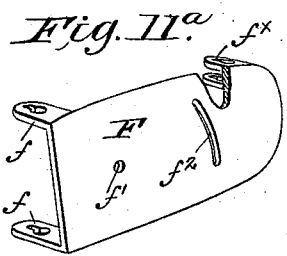
Fig. 11ª.
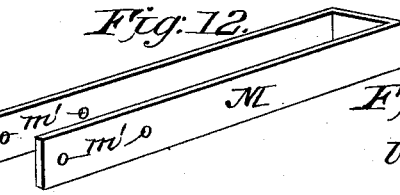
Fig. 12.
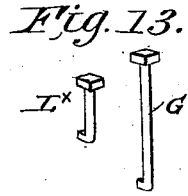
Fig. 12ª.
Fig. 13.
WITNESSES:
Fred G. Dieterich
W. D. Blondel
INVENTOR
William F. Hartig
BY Munn & Co
ATTORNEYS.

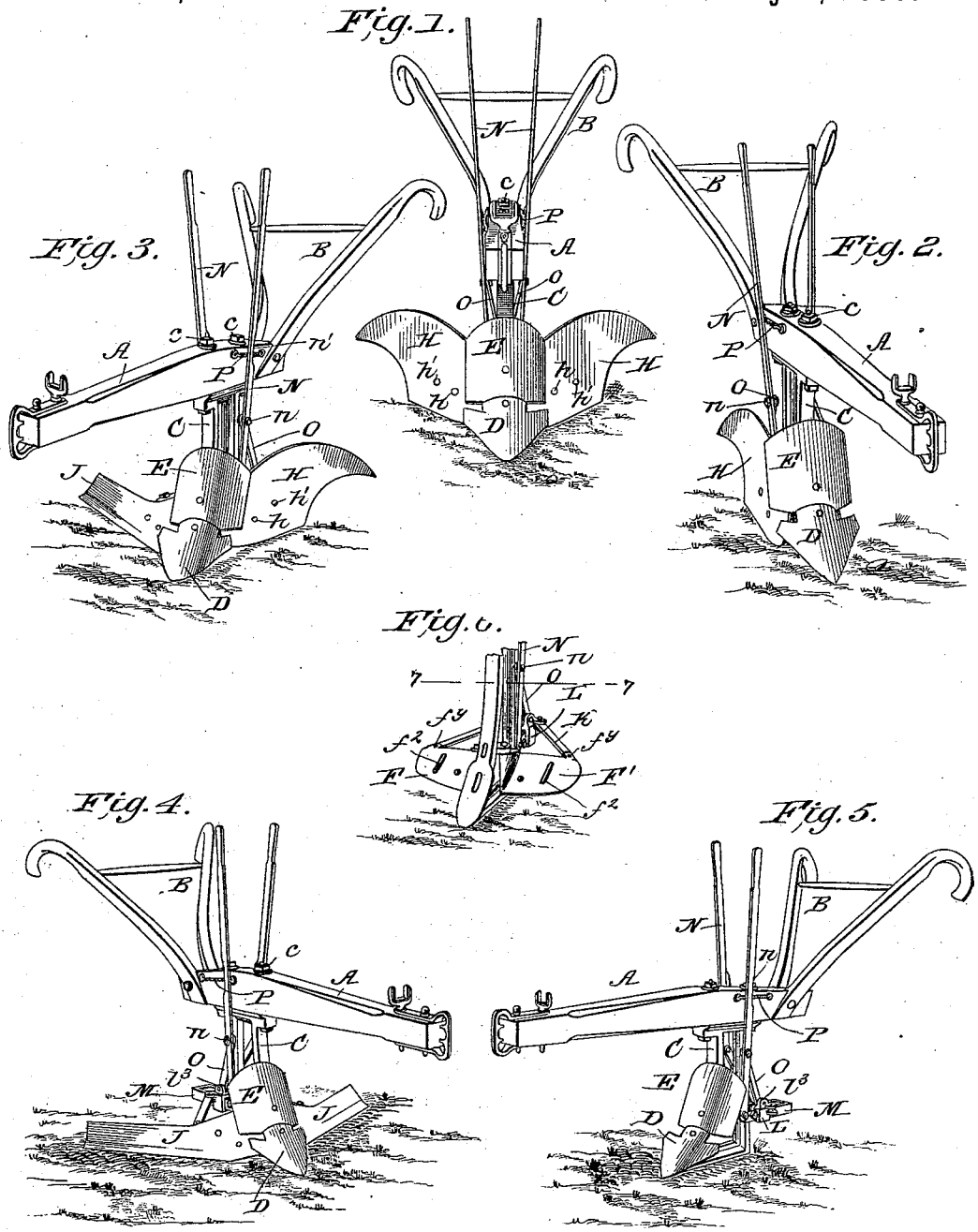

UNITED STATES PATENT OFFICE.

WILLIAM FREDRICH HARTIG, OF EVANSVILLE, INDIANA.

SHOVEL-PLOW.

SPECIFICATION forming part of Letters Patent No. 538,962, dated May 7, 1895.

Application filed August 2, 1894. Serial No. 519,273. (No model.)

*To all whom it may concern:*

Be it known that I, WILLIAM FREDRICH HARTIG, residing at Evansville, in the county of Vanderburg and State of Indiana, have invented certain new and useful Improvements in Plows, of which the following is a specification.

My invention relates to that class of plows having laterally extending wings or sweep members, and it primarily has for its object to provide a plow of this character in which the several sweep or cutter attachments can be readily attached to or detached from the standard, and which can be easily adjusted to the desired vertical angles.

It has also for its object to provide certain lever devices, secured to the plow standard, which can be quickly connected to the attached parts and which will when manipulated, serve to adjust the sweep or cutter members toward or from the standard as the conditions may require.

With other objects in view my invention consists in such novel features of construction and peculiar combination of parts as will hereinafter be first described in detail and then be specifically pointed out in the appended claims, reference being had to the accompanying drawings, in which—

Figure 1 is a perspective view of my improved plow provided with lister-wings spread out to their full width. Fig. 2 is a similar view with the lister-wings swung back parallel with the heel of the plow-standard. Fig. 3 is a perspective view of the plow with one lister-wing and one cutter-wing. Fig. 4 is a view showing the two cutter-wings applied and spread out to their full extent and arranged with their cutting-edges level with the ground. Fig. 5 is a perspective view of the plow arranged as a single-shovel plow, all the wings being detached. Fig. 6 is a detail view of the standard with the sub-wings spread out full. Fig. 7 is a horizontal section taken, practically, on the line 7 7 of Fig. 6. Fig. 8 is an inverted plan view of the plow with the cutter-wings swung back parallel with the heel of the standard. Fig. 9 is a perspective view of the plow-standard. Fig. 10 illustrates the plow and one of the operating-levers detached. Figs. 11 and 11$^a$ are perspective views of the sub-wings hereinafter referred to. Figs. 12 and 12$^a$ are detail views, respectively, of yoke or slide member and one of the slides movable thereon; and Fig. 13 is a view of two of the teat-bolts hereinafter referred to.

In the practical construction of my improved plow the beam A, and the handle B are of the regular pattern, the beam being connected to the standard C by the bolts $c\ c$ which pass through the beam and apertures $c'\ c'$ in the ends of the standard as shown.

The standard C is of substantially the shape shown in Fig. 9 its front or toe portion C' having slots $C^2\ C^3$ to receive the fastening bolts for the plow point D, and a central mold board E, which point and mold board are arranged as shown in Fig. 5, they serving the purpose of an ordinary plow, when so adjusted. The heel $C^8$ of the standard terminates at a back brace member $C^3$, which at a suitable distance from the bottom or heel $C^8$, has a longitudinal extension or ears $c^3\ c^3$ which are perforated as at $c^4\ c^4$ for a purpose presently explained.

The heel $C^8$ near the forward end has transversely projecting apertured ears $C^4\ C^4$ which are held below and in alignment with laterally projecting horizontal ears $C^5\ C^5$ on the front member of the standard as clearly shown in Fig. 9.

F and F' indicate two forms of sub wings, one of each of which is shown in Figs. 11 and 11$^a$, which are adapted to be pivotally connected to the ears $C^4\ C^5$, one form F of such wings being adapted to form the connection for the lister wings and the other F' the connection for the cutter wings presently referred to. Each of the sub wings has at the front upper and lower ends, ears $f$, through which the pivot bolts G pass and which join such wings to the ears $C^4\ C^5$, they also having apertures $f'$ and segmental slots $f^2$. When it is desired to attach the listing wings H, the wings F, (the front faces of which are flat) are used, to connect such wings H with the standard, and such wings are secured by pivot bolts $h$ which pass through the apertures $f'$, and adjusting bolts $h'$ which pass through slots $f^2$, such connecting means providing for the ready adjustment of the wings H vertically so that they can be set, as the hilly condition of the soil or plant rows may require.

When it is desired to use the cutter wings J, the sub-wings F' are used which wings have shouldered projections F$^x$ against which the inner ends of such wings J abut, which wings are perfectly straight on the flat sides but are made wider at the inner end, so as to fully cover the sub wings F' and thereby add strength to the wing portions proper.

The wings J are secured for vertical adjustment on the wings F' the same way the lister wings are adjusted, and in both cases the securing bolts are countersunk so as to leave an uninterrupted smooth surface on such wings H and J.

At the outer edge of the rear face, each of the wings F F' has bifurcated apertured ears $f^x$, to which are pivoted, by the bolts $f^y$ one end of link arms K K, the other ends of which are pivoted between bifurcated ears $l\,l$ formed on slide members L which ears have apertures $l'$ formed with lateral notches $l^2$ whereby such members can be quickly and securely connected by means of teat bolts L$^x$ as clearly shown in Fig. 13.

It will be noticed that in Fig. 7 a pair of members L are employed, which are held to slide on a horizontally disposed yoke frame M, which extends rearward from the standard, its front ends embracing the rear member thereof and secured thereto by bolts $m$ $m^x$ which pass through apertures $m'$ in such ends and the apertures $c^4$, in the ears $c^3$. The forward bolts $m^x$, also swing as pivot bolts to which the lower ends of the operating levers N N are attached.

It is manifest that by providing the slides L and the sub wings with apertured ears, and joining the link arms thereto by teat bolts, the said wings can be quickly attached or detached without the use of wrenches or nuts. The slides L are also provided with apertured ears $l^3$ $l^3$ to which link arms O O are pivoted, which arms are also pivoted to the levers N N at $n\,n$, and such levers have each a lock portion $n'$, which are adapted to engage rack members P secured on the sides of the beam as shown.

From the foregoing description taken in connection with the drawings, it will be readily seen the several lister or cutter wings can be quickly attached or detached, and adjusted to a position vertically as the condition of the hill or row may require.

The plow may be used as an ordinary bull tongue plow, see Fig. 6, or it may have lister blades at each side as in Fig. 1, double cutter wings as in Fig. 4, or one cutter and one lister wing as in Fig. 3. In either adjustment the said wings can be quickly and conveniently swung inward or outward by shifting the operating levers, and when desired such wings can be swung back parallel with the heel of the standard as shown in Figs. 2 and 8, such operation being effected by the slides L moving inward or outward on the yoke guide from K. It will be also noticed the several parts of the plow are so arranged as to compactly fit together, and braced to form a strong and effective plow, and the parts so connected relatively to each other, that the same can be easily manipulated and will effectively and positively serve for the intended purposes.

Having thus described my invention, what I claim, and desire to secure by Letters Patent, is—

1. As an improvement in plows, the combination with the standard, having a plow point and mold board, of sub wings pivotally secured to the standard adjacent the plow point, wing members detachably secured to such sub wings and lever mechanism adapted to be detachably connected to the sub wings all arranged substantially as shown and described.

2. As an improvement in plows the combination with the standard, having laterally extended vertically aligning apertured ears, of the sub wings, having apertured ears adapted to fit the standard ears and the pivot bolt for such ears, said wings having shouldered projections on the front face at the inner end, the cutter wings having portions abutting such shouldered portion, adjustably secured on such sub wing, and lever mechanism for swinging the sub wings laterally all arranged substantially as shown and described.

3. The combination with the standard, the yoke guide frame projected horizontally rearward therefrom, the slides held thereon, and the levers pivoted to the standard, and projected above the beam, said slides having apertured ears of the sub wings pivoted to the standard to swing inward, having apertured ears at the outer end, and the link arms detachably connected with the slides, the levers, and the sub wings, and the teat bolt connections therefor all substantially as shown and for the purposes described.

WILLIAM FREDRICH HARTIG.

Witnesses:
RICHARD E. GRAVES,
EMMET L. RICHARDSON.